United States Patent
Doi et al.

(10) Patent No.: US 10,069,815 B2
(45) Date of Patent: Sep. 4, 2018

(54) SERVER APPARATUS, COMMUNICATION SYSTEM, AND DATA ISSUING METHOD

(71) Applicant: KABUSHIKI KAISHA TOSHIBA, Minato-ku, Tokyo (JP)

(72) Inventors: Yusuke Doi, Yokohama (JP); Yoshihiro Oba, Kawasaki (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 353 days.

(21) Appl. No.: 14/301,793

(22) Filed: Jun. 11, 2014

(65) Prior Publication Data
US 2014/0373118 A1  Dec. 18, 2014

(30) Foreign Application Priority Data
Jun. 12, 2013  (JP) ................. 2013-123396

(51) Int. Cl.
H04L 29/06 (2006.01)
H04L 9/32 (2006.01)

(52) U.S. Cl.
CPC ........ H04L 63/0823 (2013.01); H04L 9/3268 (2013.01)

(58) Field of Classification Search
CPC ... H04L 9/3265; H04L 9/3263; H04L 9/3268; H04L 63/0823; H04L 29/06775; H04L 2209/38
See application file for complete search history.

(56) References Cited

U.S. PATENT DOCUMENTS 6,134,551 A * 10/2000 Aucsmith ............... G06F 21/34
6,233,341 B1 * 5/2001 Riggins ................. H04L 63/06
 380/277
7,548,928 B1 * 6/2009 Dean ................. G06F 17/30985
(Continued)

FOREIGN PATENT DOCUMENTS

JP   2010-226326   10/2010

OTHER PUBLICATIONS

J. Hui, et al., "Multicast Protocol for Low Power and Lossy Networks (MPL) Draft-ietf-roll-trickle-mcast-04", Feb. 25, 2013, 31 pages.
(Continued)

Primary Examiner — Benjamin E Lanier
Assistant Examiner — Paul E Callahan
(74) Attorney, Agent, or Firm — Nixon & Vanderhye, P.C.

(57) ABSTRACT

There is a server apparatus in which: an issuing unit issues data to devices; a distribution manager distributes the data to devices; a data manager manages data set as issued; a revocation manager detects, from the data set, data that satisfies a condition, and invalidates the detected data; and a filter manager updates and distribute to devices a filter having a predetermined bit length each time data is invalidated, by setting one of a first value and a second value to each of bits in the filter when a revoked data set is projected onto the filter; the data manager identifies data other than the invalidated data, having projection onto at least one of bits whose value has changed between before and after the update, and having the first value for all of bits projected onto the updated filter and reissues data to the device having the identified data.

18 Claims, 7 Drawing Sheets

(56) References Cited

U.S. PATENT DOCUMENTS

| | | | |
|---|---|---|---|
| 8,738,901 B2* | 5/2014 | Fu | H04L 63/0823 |
| | | | 713/156 |
| 2005/0223102 A1* | 10/2005 | Zhang | H04L 45/00 |
| | | | 709/228 |
| 2010/0228701 A1* | 9/2010 | Harris, III | H04L 51/12 |
| | | | 707/683 |
| 2012/0072721 A1* | 3/2012 | Rescorla | H04L 9/3268 |
| | | | 713/158 |
| 2013/0238897 A1* | 9/2013 | Mashatan | H04L 63/20 |
| | | | 713/158 |
| 2016/0026455 A1* | 1/2016 | Jeffrey | G06F 8/65 |
| | | | 709/217 |

OTHER PUBLICATIONS

J. Haas et al., "Efficient Certificate Revocation List Organization and Distribution", 9 pages, Mar. 2011.

\* cited by examiner

SERVER APPARATUS, COMMUNICATION SYSTEM, AND DATA ISSUING METHOD

CROSS-REFERENCE TO RELATED APPLICATIONS

This application is based upon and claims the benefit of priority from Japanese Patent Application No. 2013-123396, filed Jun. 12, 2013; the entire contents of which are incorporated herein by reference.

FIELD

Embodiments described herein relate to a server apparatus, a communication system, and a data issuing method.

BACKGROUND

There is a technique in which a Bloom filter generated from a certificate revocation list is distributed from a certificate authority to every node instead of the certificate revocation list.

According to this technique, each node tests whether a certificate presented by a certain node is valid, with the use of the Bloom filter. At this time, if a certain certificate of distributed certificates is revoked, false-positive occurs in the testing using the Bloom filter, due to characteristics of the Bloom filter. That is, a certificate that is treated as revoked in spite of the fact that the certificate is not actually revoked occurs.

Hence, in a case where the certificate presented by the certain node is determined as positive by the Bloom filter, each node needs to query the certificate authority (server apparatus) whether this certificate is really revoked (is not false-positive), and this causes problems of increases in the load of frequency band used by the server apparatus and a load on the server apparatus.

DETAILED DESCRIPTION

Figure 1:
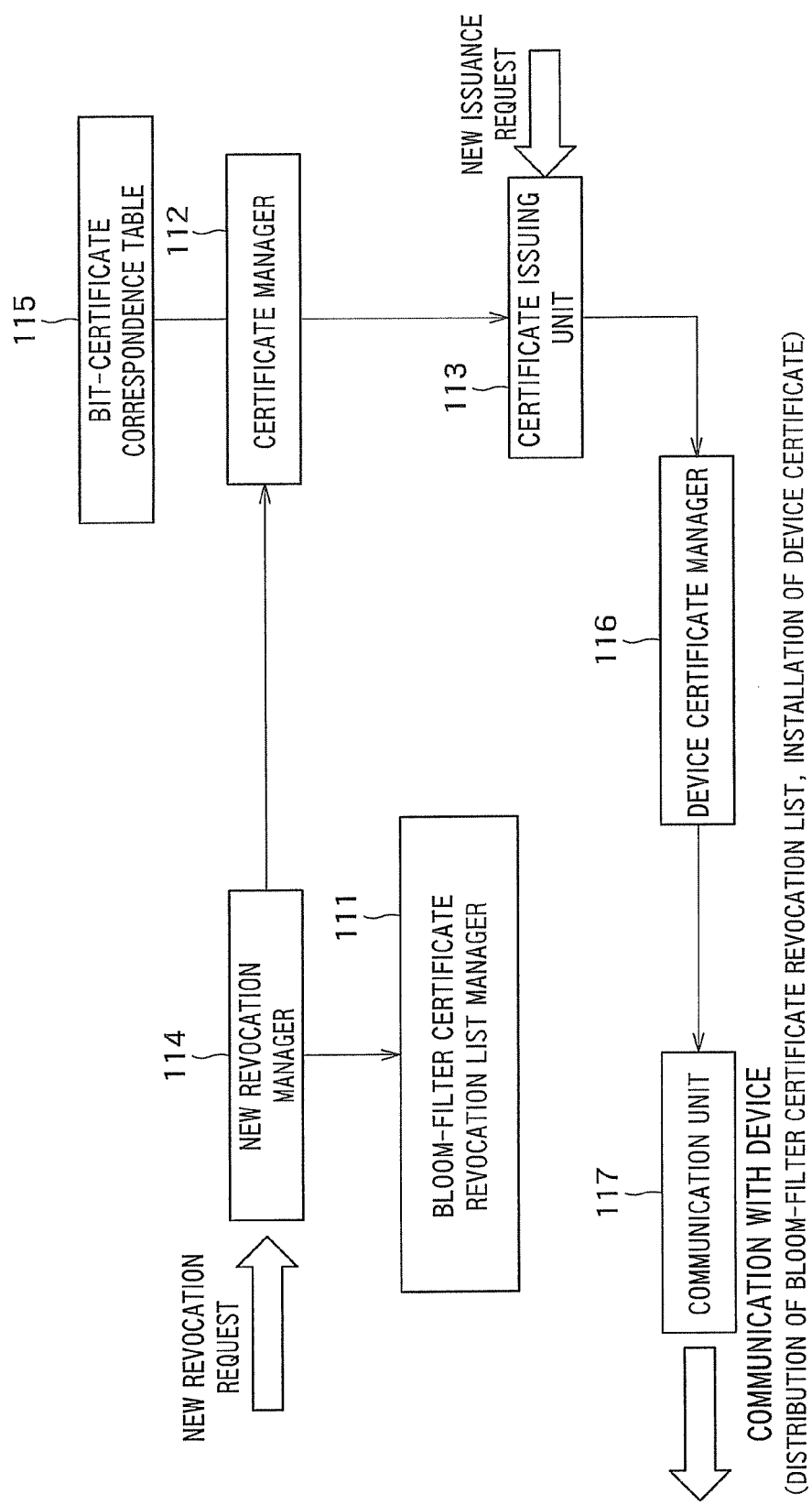
FIG. 1 is a block diagram of a server apparatus according to a first embodiment.

According to one embodiment, there is provided a server apparatus including: a communication unit, a data issuing unit, a data distribution manager, a data manager, a revocation manager and a filter manager.

The communication unit connects to a wireless network in which a plurality of devices are connected.

The data issuing unit issues data to the devices in the wireless network, respectively.

The data distribution manager distributes the data issued by the data issuing unit to the devices, respectively.

The data manager manages a data set including the data issued by the data issuing unit.

The revocation manager detects, from the data set, data that satisfies a predetermined condition and invalidates the data detected.

The filter manager manages a revoked data set that is a set of pieces of data invalidated by the revocation manager; updates a filter having a predetermined bit length each time the revocation manager invalidates data, by setting a first value to a bit projected when the revoked data set is projected onto the filter according to a definitive projection relation and setting a second value to a bit different from the projected bit in the filter; and distributes the filter after update to the devices in the network.

The data manager: identifies, from the data set, reissuance target data other than the data invalidated by the revocation manager, the reissuance target data having projection onto at least one of bits whose bit value has changed from the second value to the first value between before and after the update of the filter, and having the first value for all of bits projected when the reissuance target data is projected onto the filter after the update; and for the device having the reissuance target data, reissues data having the second value for at least one of bits projected when that data is projected onto the filter after the update, by means of the data issuing unit, and distributes a reissued data to the device.

Hereinafter, embodiments of the present invention are described with reference to the drawings.

First Embodiment

First, the outline of the present embodiment is described. A system is assumed in which a server apparatus as a certificate authority issues and manages a certificate to each device (communication apparatus). Note that, for each device, there are a factory-installed certificate of the device itself and a certificate (session certificate) for participating in a secure network configured by reliable devices. In general, the certificate of the device itself is used for certification and the like by means of a different certificate authority concerning a device vendor (a certificate authority different from a certificate authority 101 dependent on the present system). Certificates in the present embodiment are targeted at the session certificate, and a method of certifying a device using the certificate of the device itself is not the essence of the present embodiment, and thus is not described in detail.

Each device managed by the server apparatus constitutes a network including each device as a node, and the server apparatus is connected to the network. In a case where the certificate authority revokes a certain session certificate and updates a Bloom filter of a certificate revocation list, another valid session certificate may be possibly treated as revoked by the Bloom filter after the update, due to false-positive.

In this case, the server apparatus reissues and distributes a new session certificate that is not determined as positive by the Bloom filter after the update, to a device that holds the valid session certificate that becomes false-positive. When each device receives, from another device (node), a network participation request and determines whether to permit or reject the participation, each device tests a session certificate presented by the other node on the basis of a Bloom-filter certificate revocation list provided in advance by the server apparatus. In a case where the presented session certificate is determined as positive in the testing, the device that receives the participation request uniformly rejects the participation in the node network using this session certificate. Meanwhile, if the device having the session certificate that becomes false-positive presents the reissued session certificate, the reissued session certificate is determined as negative, and the participation of the device is thus permitted.

In this way, in the present embodiment, the device that receives the participation request does not need to query the server apparatus whether or not the session certificate presented by another device is really revoked (is not false-positive). Accordingly, in certificate management using the Bloom-filter certificate revocation list, oppression of a band used by the server apparatus can be reduced, and a load on the server apparatus can be reduced.

Note that the Bloom filter is described in detail in Broder et al., Network Applications of Bloom Filters: A Survey and other literatures, and hence simple description thereof is only given here.

The Bloom filter is a filter for probabilistically testing whether or not given data (element) d is contained in a data set X (i.e., a member of a data set X), through an application of a hash function.

Predetermined procedures are performed on a Bloom filter BF-X generated from the data set X, whereby whether or not the given data d is contained in the data set X can be "tested". As a result of the procedures, any of two results (positive and negative) is obtained.

In a case where the result of negative is obtained, there is no possibility that the data d is contained in the data set X. On the other hand, in a case where the result of positive is obtained, there is a high possibility that the data d is contained in the data set X. Namely, even if the result of positive is obtained, the data d is not necessarily contained in the data set X. A case where the result of positive is obtained in spite of the fact that the data d is not contained in the data set X is referred to as false-positive.

A method of generating the Bloom filter is as follows.

The following parameters are used to generate the Bloom filter.

"m": The bit length (filter length) of a bitmap forming the Bloom filter

"k": The number (phase) of independent hash functions used for the Bloom filter (1) Procedures for Generating Bloom Filter 1. A bit sequence F having the length "m" is prepared, and 0 is set to every bit.

2. "k" independent hash functions "hn( )" (where "n"=1 ... "k"), whose range is [1, m], are prepared. The "k" independent hash functions "hn( )" may be prepared by giving constants (salt) different from each other to the same hash algorithm.

3. The following processing is performed on each element "xi" in the input data set X.

(a) Set 1 to "p".

(b) If "p">"k", end the processing.

(c) Calculate "idx"="hp(xi)" using hash functions "hp( )" prepared in 2.

(d) Set 1 to the idx$^{th}$ bit in the bit sequence F (in a case where the idx$^{th}$ bit is already 1, the bit value is held at 1 without any change).

(e) Add 1 to "p".

(f) Return to the procedure 3. (b).

In short, for each element "xi" in the input data set X, the hash value "idx" is obtained from each of the "k" hash functions, and 1 is set to the idx$^{th}$ bit in the bit sequence F (in a case where the idx$^{th}$ bit is already 1, the bit value is held at 1 without any change), whereby the Bloom filter is generated.

Next, testing (filter testing) as to whether or not the data d is contained in the input data set X is performed in the following procedures.

(2) Procedures for Filter Testing

1. Set 1 to "p".

2. If "p">"k", return positive.

3. For the data d to be tested, calculate "idx"="hp(d)".

4. Test the idx$^{th}$ bit in the bit sequence F. If the idx$^{th}$ bit is 0, return negative.

5. Add 1 to "p".

6. Return to the procedure 2.

In short, the data d is inputted to each of the "k" hash functions. If all the bits corresponding to the respective outputs "idx" of the hash functions are 1, positive is returned. If at least any one of the bits corresponding to the respective outputs "idx" of the hash functions is 0, negative is returned.

Here, a case where false-positive occurs, namely, a case where positive is returned in the procedure 2. in spite of the fact that the data d is not contained in the data set X is a case where all the bits corresponding to the respective outputs "idx" of the hash functions happen to be 1. For example, a Bloom filter BF-Y generated from a data set Y including data A and data B is discussed. Bit positions of 1 in the Bloom filter BF-Y, namely, positions obtained by calculating an OR between bit positions of 1 based on the data A and bit positions of 1 based on the data B may include bit positions of 1 based on the data d. In such a case, if the data d is tested using the Bloom filter BF-Y, false-positive occurs.

Simple description of the Bloom filter is given above.

Note that, in the present embodiment, the Bloom filter is used as a filter, but this is merely an example. Any algorithm can be adopted as long as the algorithm projects supplied data onto a bitmap (or a filter) having a predetermined length on the basis of a definitive projection relation. More specifically, any algorithm can be adopted as long as it is algorithm which sets 1 (first value) to bits onto which when data is projected based on the definitive projection relation and setting 0 (second value) to bits onto which the data is not projected (i.e. bits different from the project bits). It is also possible to adopt an algorithm for data projection in which not entire data but, for example, only lower "X" bits are projected on the basis of the definitive projection relation.

FIG. 1 is a block diagram of the server apparatus according to the present embodiment.

The server apparatus includes a new revocation manager 114, a Bloom-filter certificate revocation list manager (filter manager) 111, a certificate manager (data manager) 112, a bit-certificate correspondence table 115, a certificate issuing unit (data issuing unit) 113, a device certificate manager (data distribution manager) 116, and a communication unit 117.

The new revocation manager 114 receives a revocation request (new revocation request) about a session certificate, and notifies the Bloom-filter certificate revocation list manager 111 that the session certificate is a revoked certificate. For example, the new revocation request may be inputted by a user from a user interface provided to the server apparatus, may be made by the user to the server apparatus via the network, and may be automatically issued when a predetermined condition is satisfied.

The Bloom-filter certificate revocation list manager 111 holds a certificate revocation list that is a list of revoked certificates. Moreover, the Bloom-filter certificate revocation list manager 111 generates a Bloom filter, which may be called "Bloom-filter certificate revocation list (BF-CRL)"

from the certificate revocation list according to a Bloom filter algorithm, and holds the Bloom-filter certificate revocation list.

Each time a revoked certificate newly occurs, the certificate revocation list is updated by adding the revoked certificate to the certificate revocation list, and the Bloom-filter certificate revocation list is also updated. For this update, the revoked certificate that is newly revoked may be reflected in the Bloom-filter certificate revocation list at that time (difference update), and the Bloom-filter certificate revocation list may be regenerated from the entire certificate revocation list after the addition. The former is higher in processing efficiency.

Here, the new revocation manager 114 tests whether any of session certificates that are not revoked currently (that are not registered in the certificate revocation list) becomes false-positive as a result of newly registering the revoked certificate into the Bloom-filter certificate revocation list. Note that information concerning session certificates that have been issued until then is managed by the certificate manager 112. In a case where any of the session certificates newly becomes false-positive, the new revocation manager 114 reports the session certificate to the device certificate manager 116. An example of the testing method is described later. Note that the new revocation manager 114 may create and manage a list of session certificates determined as false-positive (false-positive certificate list). The false-positive certificate list may be used to test whether any of the session certificates becomes false-positive.

The certificate issuing unit 113 receives a new issuance request, and newly issues a session certificate. The session certificate is a byte sequence or a bit sequence that is calculated according to a certain algorithm on the basis of a random number generated by a random number generator. The certificate issuing unit 113 tests whether the newly issued session certificate is positive with reference to the Bloom-filter certificate revocation list managed by the Bloom-filter certificate revocation list manager 111. If the newly issued session certificate is positive, the certificate issuing unit 113 discards the session certificate. The certificate issuing unit 113 repetitively generates a session certificate until a session certificate that does not become positive is obtained.

The certificate manager 112 manages a list of session certificates that have been issued until then by the certificate issuing unit 113. Moreover, the certificate manager 112 generates and manages, for each bit in the Bloom-filter certificate revocation list, a list of session certificates in which the bit is 1 (bit-certificate correspondence table 115). "The bit is 1" means having projection onto the bit. That is, the session certificate is projected for each of "k" hash functions, and, if a value of a bit indicated by a value (index) of each of one or more hash function is 1 in the Bloom-filter certificate revocation list, the session certificate is associated with the bit(s) or a certain index number(s) indicating the bit(s). Note that, in a case of using the "k" hash functions, the maximum number of projection target bits is "k" (one certificate may be projected onto the same bit from a plurality of hash functions).

Now, description is given of an example of the method of testing whether any of the session certificates becomes false-positive as a result of registering the revoked certificate into the Bloom-filter certificate revocation list.

For example, the Bloom-filter certificate revocation list before the revoked certificate registration is compared with the Bloom-filter certificate revocation list after the revoked certificate registration, whereby bits that newly change from 0 to 1 are identified. The bit-certificate correspondence table 115 of the certificate manager 112 is referred to for each identified bit, and a session certificate associated with the bit is detected. The session certificates respectively detected for the identified bits are tested with reference to the Bloom-filter certificate revocation list after the revoked certificate registration, and whether any of the session certificates becomes positive is tested. If any of the session certificates becomes positive, the session certificate is determined as false-positive. Note that, for the session certificate that is determined as false-positive in the course of the test for each identified bit, the test for the bit may be omitted at that point even if this session certificate is further associated with another bit.

According to another example of the testing method, it is tested whether each bit (corresponding to a newly revoked session certificate) in the Bloom-filter certificate revocation list before the registration is already 1. Bits that are yet to become 1 (that are still 0) are identified. A session certificate corresponding to each identified bit is identified with reference to the bit-certificate correspondence table 115. It is tested whether the identified session certificate is positive with reference to the Bloom-filter certificate revocation list after the registration. If any session certificate is positive, the session certificate is determined as false-positive.

The two testing methods are described above as mere examples, and other methods can also be adopted.

The device certificate manager 116 manages a certificate installed in each device. Namely, the device certificate manager 116 manages a correspondence between each device and the session certificate installed in the device. When a new device is registered, the device certificate manager 116 requests the certificate issuing unit 113 to issue a new session certificate, and installs the session certificate issued by the certificate issuing unit 113 into the device. Note that, as described above, the certificate issuing unit 113 repetitively generates a session certificate until a session certificate that does not become positive with reference to the Bloom-filter certificate revocation list is obtained, and outputs the session certificate that does not become positive, to the device certificate manager 116. Note that, in a case where a session certificate that becomes positive is generated, the session certificate is deleted.

Moreover, in a case where a session certificate that becomes false-positive is reported by the new revocation manager 114, the device certificate manager 116 requests the certificate issuing unit 113 to issue a new session certificate. The device certificate manager 116 installs the session certificate issued by the certificate issuing unit 113 into a device having the false-positive session certificate. The device may use the newly installed session certificate thereafter instead of the false-positive session certificate.

The communication unit 117 wirelessly communicates with a device (communication apparatus) that exists in a communicable range. The communication unit 117 transmits, to the device, a session certificate to be installed into the device. Moreover, if the Bloom-filter certificate revocation list manager 111 generates or updates the Bloom-filter certificate revocation list, the communication unit 117 distributes the list to the device. To a device that exists outside of the communicable range, the communication unit 117 distributes the session certificate and the list, via the device that exists in the communicable range.

Figure 2:
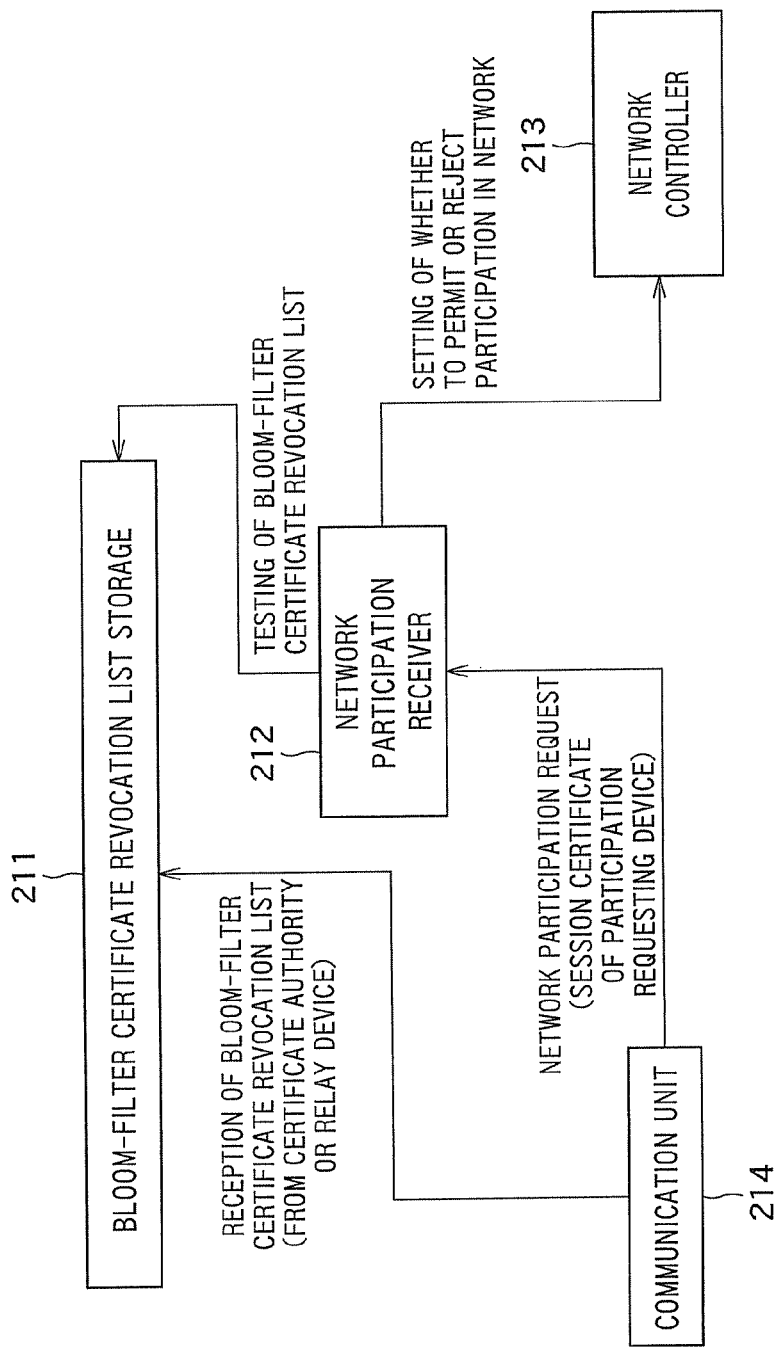
FIG. 2 is a block diagram of a device according to the first embodiment.

FIG. 2 is a block diagram of the device as the communication apparatus according to the present embodiment.

The device includes a Bloom-filter certificate revocation list storage 211, a network participation receiver 212, a communication unit 214, and a network controller 213.

The communication unit 214 wirelessly communicates with an apparatus (the server apparatus, another device, or both) that exists in a communicable range. Moreover, the communication unit 117 has a function of relaying communication between devices or between the device and the server apparatus.

The communication unit 214 receives the Bloom-filter certificate revocation list generated by the server apparatus directly from the server apparatus or via another device, and transmits the list to the Bloom-filter certificate revocation list storage 211. The Bloom-filter certificate revocation list storage 211 stores the received list therein, or updates the internally stored list with the received list.

The network participation receiver 212 receives a network participation request from another device via the communication unit 214. The network participation receiver 212 tests a session certificate presented by the device that makes the participation request, on the basis of the Bloom-filter certificate revocation list in the Bloom-filter certificate revocation list storage 211, and determines whether the session certificate is positive or negative.

In a case where the session certificate is determined as positive, the network controller 213 determines to reject the participation of the device that makes the participation request, and notifies the device that the participation is rejected. On the other hand, in a case where the session certificate is determined as not positive (as negative), the network controller 213 permits the participation of the device, and performs processing for connecting the device to the network. That is, the network controller 213 sets a communication path with the device, and also makes relay settings as needed.

Hereinafter, a specific configuration example of the present embodiment is described.

Figure 3:
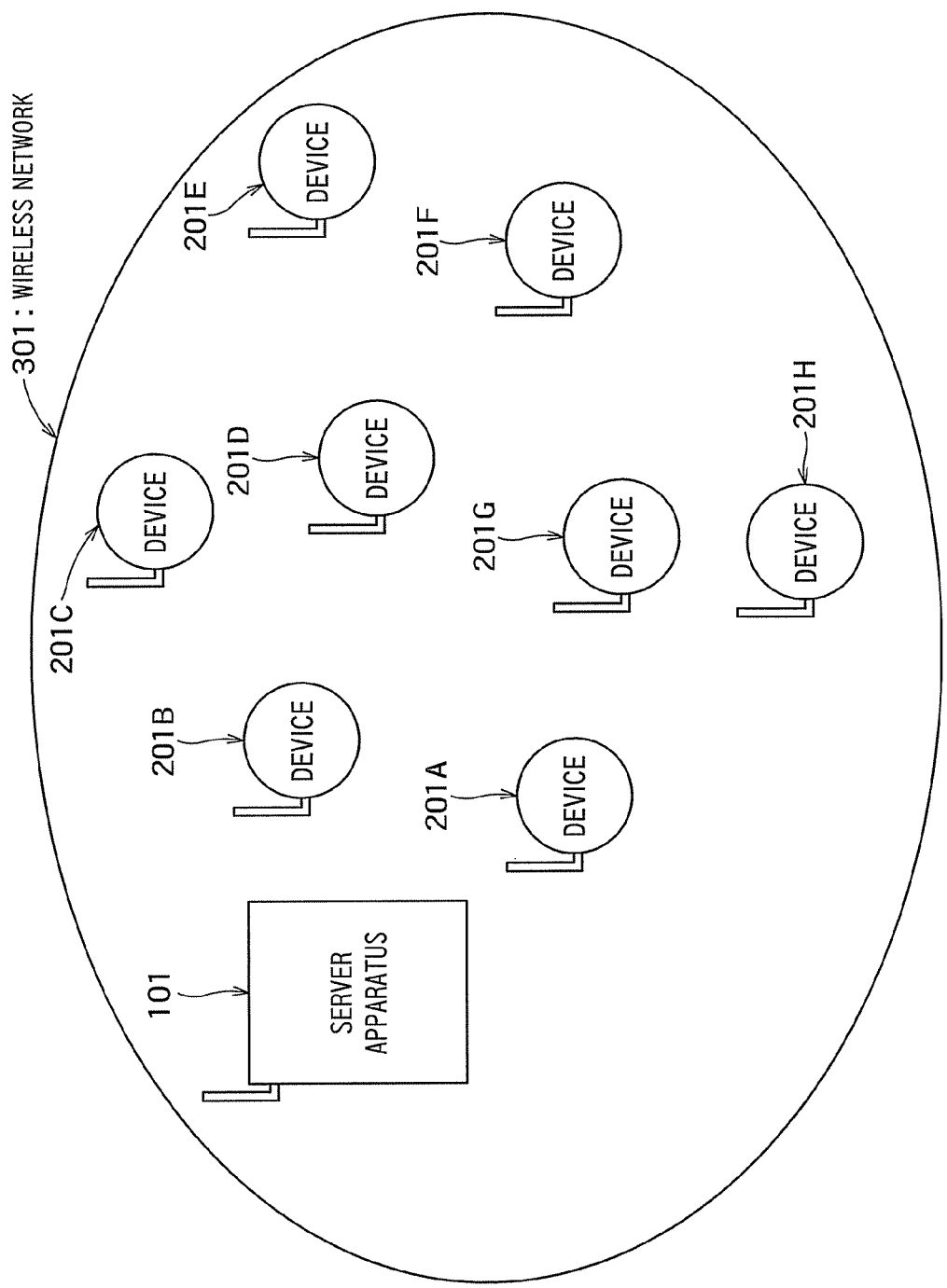
FIG. 3 is a diagram illustrating an overall configuration example of a communication system including a server apparatus and a plurality of devices according to the first embodiment.

FIG. 3 illustrates an overall configuration example of a system including a server apparatus and a plurality of devices according to the first embodiment.

The present system is configured as a wireless network 301 including a server apparatus 101 as a certificate authority and devices 201A, 201B, 201C, 201D, 201E, 201F, 201G, and 201H certified and permitted by the server apparatus 101.

Note that, as described above, for each device, there are a factory-installed certificate of the device itself and a certificate (session certificate) for participating in a secure network configured by reliable devices. In the present embodiment, a method of certifying a device using the certificate of the device itself, which is not described in detail, generally involves certification and the like by means of a different certificate authority concerning a device vendor (a certificate authority different from the certificate authority 101 dependent on the present system). Moreover, the session certificate is issued by the certificate authority 101 dependent on the system.

Each device includes a permission unit (corresponding to the network participation receiver 212) for permitting a request to participate in the present network system from another device. In a case where a signature of the session certificate presented by another device can be certainly tested using a public key of the certificate authority 101 and where the presented session certificate is not determined as positive (revoked) with reference to the Bloom-filter certificate revocation list distributed thereto, the permission unit permits network access of the other device that presents the session certificate.

Note that examples of such a network system including the devices and the certificate authority include a network (neighborhood area network (NAN)) in which devices such as smart meter are disposed so as to carry out wireless multi-hop communication.

The NAN includes a concentrator having a function of the certificate authority and a plurality of devices each having a relay function. A device that exists at a wirelessly communicable distance in a given range from the concentrator relays wireless communication to another device, and wireless communication is relayed even between a plurality of devices that cannot communicate with the concentrator, whereby communication of all the devices that participate in the network is possible.

Meanwhile, a communication path between a device and a device is frequently switched in accordance with a change in environments and the like. In a configuration that can be conceived when a device switches its path, a switching destination device determines whether to permit the switching (that is, determines whether to permit network access) on the basis of a session certificate of the device. At this time, the mechanism disclosed in the present embodiment is applied, whereby communication with the concentrator can be minimized (ideally zero) upon such switching.

The certificate authority 101 manages the Bloom-filter certificate revocation list having the length "m" and the phase "k" in addition to the normal certificate revocation list. This is achieved by the Bloom-filter certificate revocation list manager 111.

In addition, session certificates that have been issued by the certificate authority 101 and fall within a valid period or session certificates that fall within a period obtained by adding a certain margin to the valid period are managed by the certificate manager 112. Note that session certificates that fall within the valid period but are revoked in response to revocation requests are managed by the Bloom-filter certificate revocation list manager 111. Session certificates that currently fall within the valid period and are not revoked can be identified by obtaining a difference between the two.

A new session certificate is issued by the certificate issuing unit 113. A session certificate is revoked by the new revocation manager 114. Moreover, the certificate authority 101 manages a session certificate to be installed into each device, by means of the device certificate manager 116.

Each device has a function of receiving the Bloom-filter certificate revocation list from the certificate authority 101 or a neighboring similar device and permitting a session (network access) of a participation requesting device using this list.

Each device also has a function of receiving a session certificate installed by the certificate authority 101 through a secure certification-dedicated communication path between the device and the certificate authority 101 (for example, an indirect communication path using RFC6345{PANA Relay Element}).

Here, as described above, the certificate authority 101 manages valid session certificates that have been issued, and there are devices respectively corresponding to the session certificates. Each device (node) that participates in the secure network is certified and permitted for new participation at any time point in the past, and an individual session certificate is delivered to the device. Device reparticipation including path switching can be easily carried out using the session certificate. For example, in a case where radio disturbance is caused by an obstacle and where temporary disconnection occurs, a reparticipation process may be required. Even in this case, the reparticipation can be easily permitted between devices by presenting the session certificate without communicating with the concentrator.

In a distributed system, particularly, a distributed system concerning multihop communication, a channel exists in many cases for sharing information in the entire network through repetitive broadcast (or (a scheme called) trickle multicast). The Bloom-filter certificate revocation list generated by the Bloom-filter certificate revocation list manager 111 can be shared by all the devices that participate in the secure network, through such an information exchange channel.

Note that, for update of the Bloom-filter certificate revocation list, the entire bitmap may be transmitted, and only a difference in the bitmap may be updated. In order to achieve the difference update, version management of the Bloom-filter certificate revocation list installed in each device is necessary, and hence the processing is more complicated.

With the use of the Bloom-filter certificate revocation list disclosed in the present embodiment, whether or not to permit reparticipation of a certified device can be completed by only testing the signature of the session certificate presented by the participation requesting device and testing the session certificate based on the Bloom-filter certificate revocation list. Note that the testing of the signature is not the essence of the present embodiment, and hence further description thereof is omitted.

Up to now, it has been necessary to query the certificate authority whether a session certificate that becomes positive with reference to the Bloom-filter certificate revocation list is actually positive (namely, revoked) or false-positive (namely, not revoked). Hence, there have been problems that a communication band of the certificate authority is oppressed and that a load on the certificate authority increases.

In comparison, in the present embodiment, a new session certificate can be expected to be issued for a current session certificate that is determined as false-positive by the certificate authority, and hence a session certificate that is determined as positive in filter testing of a device can be uniformly treated as revoked. As a result, the frequency of query to the certificate authority can be reduced. More specifically, a usage of frequency band used by the concentrator that is the most precious in many cases can be saved.

It is assumed that, in such a system, a session certificate needs to be revoked for the reason of, for example, a device theft. At this time, in the certificate authority 101, the new revocation manager 114 receives a new revocation request about the session certificate to be revoked, and the Bloom-filter certificate revocation list manager 111 is notified to that effect. The Bloom-filter certificate revocation list manager 111 adds the session certificate corresponding to the new revocation request to the certificate revocation list, and updates the Bloom-filter certificate revocation list.

The new revocation manager 114 tests whether any of the valid session certificates that have been issued becomes false-positive as a result of updating the Bloom-filter certificate revocation list.

For example, the Bloom-filter certificate revocation list before the revocation registration is compared with the Bloom-filter certificate revocation list after the revocation registration, whereby bits that change from 0 to 1 through the registration are detected. It is tested whether each session certificate corresponding to each detected bit in the bit-certificate correspondence table 115 becomes positive with reference to the Bloom-filter certificate revocation list after the registration. If any session certificate that becomes positive is detected, determination of the session certificate is false-positive.

Figure 4:
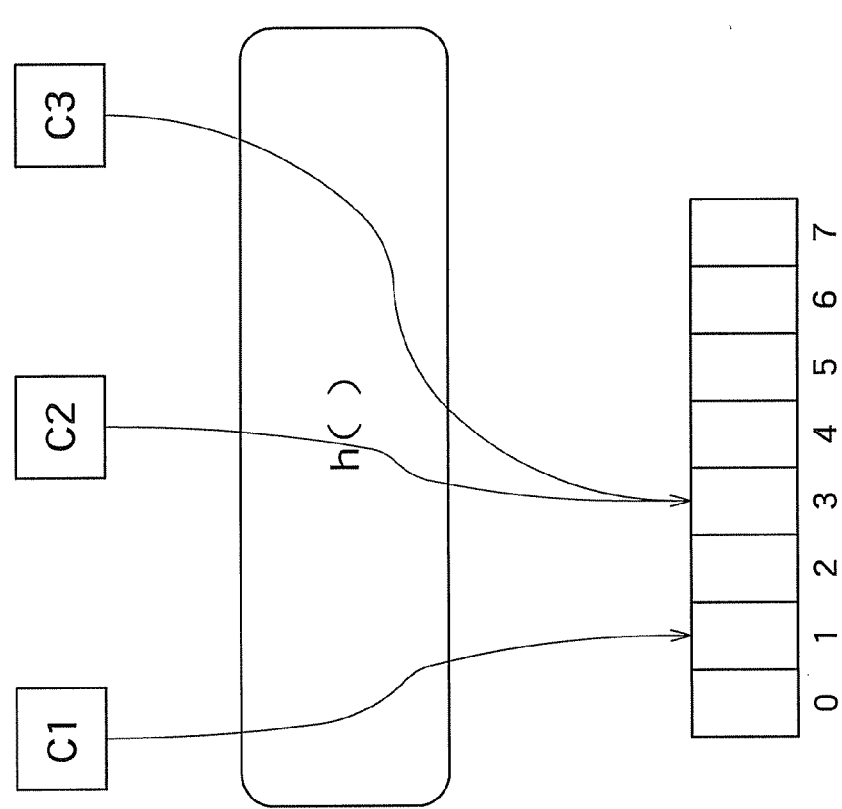
FIG. 4 is a diagram illustrating a specific example of testing according to the first embodiment.

Hereinafter, a specific example of the testing is described with reference to FIG. 4. For ease of description, FIG. 4 illustrates a case where the bit length "m" of the bitmap forming the Bloom filter is 8 and where the number (phase) "k" of independent hash functions used for the Bloom filter is 1.

Session certificates C1, C2, and C3 are created and installed in devices M1, M2, and M3. These session certificates are each assigned to one bit of the Bloom filter (because "k"=1).

It is assumed here that C2 and C3 are assigned to the same bit (No. 3 bit) and that C1 is assigned to a No. 1 bit. A state of this assignment is illustrated in the left of FIG. 4. "h( )" represents a hash function. The range of the hash function is 0 to 7. If a byte sequence of C1 is inputted to the hash function, 1 is outputted, and hence C1 is assigned to the No. 1 bit (the second bit from the head). Similarly, if byte sequences of C2 and C3 are inputted to the hash function, the same value 3 is outputted, and hence C2 and C3 are assigned to the No. 3 bit (the fourth bit from the head). Accordingly, values of the No. 1 and No. 3 bits in the Bloom filter are 1, and values of No. 0, No. 2, and No. 4 to No. 7 bits therein are 0. Moreover, the bit-certificate correspondence table 115 obtained in this case is illustrated in the right of FIG. 4. Note that, in a case where "k" is equal to or more than 2, the same session certificate can be assigned to a plurality of bits.

A case where the session certificates C1 and C2 are sequentially added to the certificate revocation list (which is assumed to be empty in its initial state) is discussed here. The case where C1 is registered into the certificate revocation list is first described.

Upon reception of C1, the new revocation manager 114 transmits C1 to the Bloom-filter certificate revocation list manager 111, and acquires the Bloom-filter certificate revocation list before the registration and the Bloom-filter certificate revocation list after the registration from the Bloom-filter certificate revocation list manager 111.

The Bloom-filter certificate revocation list before the registration is |0=|0|0|0|0|0|0|0|, whereas the Bloom-filter certificate revocation list after the registration is |0|1|0|0|0|0|0|0|.

Here, because the second bit from the head changes from 0 to 1, the bit-certificate correspondence table 115 is searched for a session certificate corresponding to this bit, so that it is found out that no other session certificate than C1 is associated with this bit. Accordingly, it can be understood that no session certificate becomes false-positive as a result of this new registration into the certificate revocation list.

Similarly, upon reception of a new revocation request about the session certificate C2, the new revocation manager 114 transmits C2 to the Bloom-filter certificate revocation list manager 111, and acquires the Bloom-filter certificate revocation list before the registration into the certificate revocation list and the Bloom-filter certificate revocation list after the registration thereinto.

Because C1 has already been registered, the Bloom-filter certificate revocation list before the registration is |0|1|0|0|0|0|0|0|, and the Bloom-filter certificate revocation list after the registration is |0|1|0|1|0|0|0|0|.

Here, because the fourth bit from the head newly changes from 0 to 1, the bit-certificate correspondence table 115 is searched for a session certificate corresponding to this bit, so that it is found out that C3 corresponds to this bit. A condition for making C3 false-positive is that every bit with which C3 is associated (onto which C3 is projected) is 1 in the Bloom-filter certificate revocation list, in spite of the fact that C3 is not registered in the certificate revocation list. Because "k"=1 in this example, it is obvious that C3 becomes false-positive.

In a case where "k"=2, whether C3 becomes false-positive is determined by testing C3 with reference to the Bloom-filter certificate revocation list after the registration. If the determination result is positive and if C3 is not registered in the certificate revocation list, C3 can be determined as false-positive.

The session certificate of the device that becomes false-positive needs to be updated. Hence, in response to a request from the device certificate manager 116, the certificate issuing unit 113 creates a new session certificate C3a for the device M3, and installs the new session certificate C3a into the device M3. For communication at this time, it is possible to use a secure communication channel that is maintained between the certificate authority and the device M3 by an action of PANA Relay Element and the like. In a case of making a participation request, the device M3 performs a network participation process on a neighboring device or the like with the use of the newly installed session certificate C3a.

A device that receives the participation request from the device M3 tests the session certificate C3a presented by the device M3 on the basis of the Bloom-filter certificate revocation list. If the session certificate C3a is not positive, the device permits the participation of the device M3. If the session certificate C3a is positive, the device uniformly rejects the participation of the device M3 (without querying the certificate authority).

Note that the installation of the session certificate into the device M3 by the device certificate manager 116 may be performed before the update and distribution of the Bloom-filter certificate revocation list, and may be performed after the update and distribution of the Bloom-filter certificate revocation list. If the Bloom-filter certificate revocation list is updated before the installation, access of the device M3 to the network is temporarily blocked, but safety can be higher. On the other hand, if the session certificate is first installed into the device M3 and if the Bloom-filter certificate revocation list is then updated and distributed, communication of the device M3 can be continuously maintained, whereas this case is more disadvantageous in terms of network safety. Alternatively, these may be updated at the same time. The update order of the session certificate and the Bloom-filter certificate revocation list may be determined by an administrator of the secure network in consideration of a balance between safety and manageability.

Figure 5:
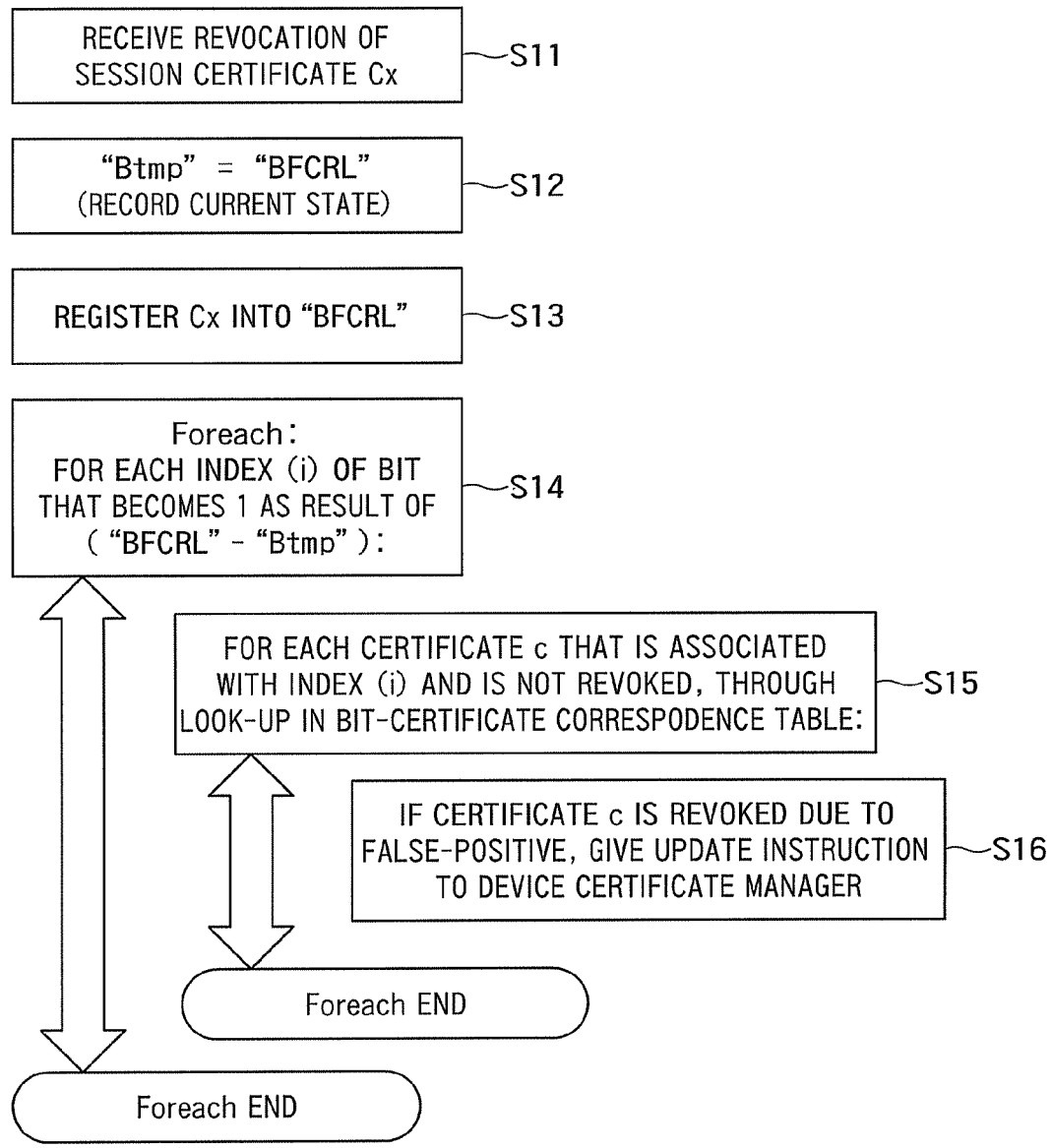
FIG. 5 is a flow chart of an operation according to the first embodiment.

FIG. 5 illustrates an example of an operation flow of the server apparatus according to the present embodiment.

The new revocation manager 114 receives a new revocation request about a session certificate Cx (Step S11).

The new revocation manager 114 reads and copies a current Bloom-filter certificate revocation list ("BFCRL") from the Bloom-filter certificate revocation list manager 111 (Step S12). In a block of FIG. 5, the copy is expressed by substituting "BFCRL" into a variable "Btmp".

The new revocation manager 114 requests the Bloom-filter certificate revocation list manager 111 to register the session certificate Cx into the current Bloom-filter certificate revocation list (Step S13). The Bloom-filter certificate revocation list manager 111 inputs the session certificate Cx to "k" hash functions to obtain resultant values, sets 1 to a bit indicated by an index of each obtained value (maintains 1 without any change if the bit is already 1), and thus updates the current Bloom-filter certificate revocation list. The Bloom-filter certificate revocation list manager 111 transmits the Bloom-filter certificate revocation list after the update to the new revocation manager 114.

The new revocation manager 114 subtracts the copied current Bloom-filter certificate revocation list before the update from the current Bloom-filter certificate revocation list after the update ("BFCRL"-"Btmp"), and identifies a bit position (index) at which a bit difference value is 1 (Step S14). Namely, the new revocation manager 114 identifies a bit position whose bit value is 0 before the update and is 1 after the update.

On the basis of the identified bit index, a session certificate that is not revoked is detected from among session certificates associated with the index, through look-up in the bit-certificate correspondence table 115 (Step S15). For example, in the example of FIG. 4, in a case where the identified index is 3, the session certificates C2 and C3 associated with the index 3 are first identified. Subsequently, whether C2 and C3 are revoked (are registered in the certificate revocation list) is tested. Assuming that only the session certificate C2 is revoked, the session certificate C3 is detected.

The detected session certificate is tested with reference to the Bloom filter certificate revocation list after the update, and whether or not the detected session certificate becomes positive is determined (Step S16). In a case of positive, because the identified session certificate is not actually revoked (is not registered in the certificate revocation list), this is false-positive. In a case of false-positive, the new revocation manager 114 instructs the device certificate manager 116 to update this session certificate (Step S16).

After that, the device certificate manager 116 issues a new session certificate by means of the certificate issuing unit 113. At this time, in a case where the issued session certificate becomes positive with reference to the Bloom filter certificate revocation list after the update, the certificate issuing unit 113 discards the issued session certificate, and repetitively issues a session certificate until a session certificate that becomes negative is issued. When the session certificate that becomes negative is issued, the device certificate manager 116 installs the session certificate into a device that holds the false-positive session certificate. Moreover, the certificate manager 112 registers the session certificate into the bit-certificate correspondence table 115.

Second Embodiment

In the first embodiment, if a bit in the Bloom-filter certificate revocation list changes from 0 to 1, a large number of session certificates may become false-positive (may be treated as revoked) at the same time. In general, bands are limited in a secure network using wireless multihop and the like, and hence it is not desirable to reissue session certificates for a large number of devices at the same time.

In view of the above, in the present embodiment, an upper limit "c" is provided to the number of session certificates corresponding to each bit in the bit-certificate correspondence table 115.

The certificate issuing unit 113 determines, for each of "k" bits corresponding to a newly issued session certificate, whether the number of session certificates described in the bit-certificate correspondence table 115 managed by the certificate manager 112 reaches "c". In a case where at least one of the "k" bits reaches "c", the certificate issuing unit 113 revokes and discards the corresponding session certificate, and retries to issue a session certificate from random number generation. Note that, even in a case where the issued session certificate becomes positive with reference to the Bloom-filter certificate revocation list, similarly to the first embodiment, the certificate issuing unit 113 discards the session certificate, and retries the issuance. The bit-certificate correspondence table 115 is updated at the time at which a session certificate that satisfies these two conditions is issued.

As a result of this processing, the number of valid session certificates that can become false-positive when a bit in the Bloom-filter certificate revocation list changes from 0 to 1, namely, the number of reissued valid session certificates can be suppressed to as small as "c"−1.

Moreover, another method that is effective when "k">=2 is described below. For example, for each of session certificates corresponding to each bit (current bit) in the bit-certificate correspondence table 115, it is assumed that the number of bits whose value is 1 among corresponding "k" bits in the Bloom-filter certificate revocation list is "s" and that the weight of the session certificate is "w"="s"/"k".

Then, the weights "w" of the session certificates corresponding to the current bit are totalized, whereby a bit weight (session certificate reissuance weight) is obtained. Each time a bit in the Bloom-filter certificate revocation list changes from 0 to 1, weights of session certificates corresponding to the bit in the bit-certificate correspondence table 115 are recalculated and totalized, whereby the bit weight of the bit is updated. When the bit weight exceeds "c", a session certificate is reissued for a device having the most highly weighted session certificate among session certificates corresponding to a bit having the bit weight that exceeds "c". Alternatively, the most highly weighted certificate may be added to the list, and the reissuance process may be sequentially executed at the timing at which a load on the network decreases (that is, the reissuance process is executed in a preventive manner when the load on the network decreases). In this way, the bit weight of each bit in the bit-certificate correspondence table 115 can be suppressed to as small as "c".

Third Embodiment

The schemes described in the first and second embodiments are based on the premise that, when a session certificate that is revoked due to false-positive is reissued, the reissued session certificate can be instantaneously installed into a device. Meanwhile, in an inter-device communication network using wireless multihop, the installation target device is not necessarily instantaneously accessible from the certificate authority. For example, in a case where the device cannot communicate with a relay device or a relay station due to existence of an obstacle or where the device is periodically activated, the device is not accessible from the certificate authority. The present embodiment solves this problem.

Discussed is a case where, in the first or second embodiment, a false-positive session certificate occurs as a result of updating the Bloom-filter certificate revocation list and where session certificate update cannot be performed on a device having the false-positive session certificate for the reason of a communication failure or the like. In this case, when the device becomes online again to make a network reparticipation request, the device presents a session certificate that is positive with reference to the Bloom-filter certificate revocation list, to a neighboring device. The neighboring device that receives the session certificate presented by the device that makes the reparticipation request determines that the presented session certificate is positive, and hence the device that makes the reparticipation request is not permitted to participate in the network.

In view of the above, in the present embodiment, a false-positive certificate list is prepared as a list for distinguishing whether the presented session certificate is actually positive or false-positive. In a case where there is a device having a session certificate that becomes false-positive and where the session certificate of the device is yet to be updated, the session certificate before the update (the session certificate determined as false-positive) is listed in this false-positive certificate list. The false-positive certificate list is distributed to each device (node) in the network. Note that, after a newly created valid session certificate is successfully installed, the session certificate may be deleted from the false-positive certificate list.

According to an operation of the present embodiment, similarly to the first and second embodiments, the device that receives the reparticipation request first tests the session certificate presented by the device that makes the reparticipation request, on the basis of the Bloom-filter certificate revocation list. In a case where the presented session certificate is determined as positive, the device that receives the reparticipation request then tests whether the presented session certificate is included in the false-positive certificate list. If the presented session certificate is included therein, the device that receives the reparticipation request notifies the certificate authority to that effect. If the presented session certificate is not included therein, the device that receives the reparticipation request rejects connection of the device that makes the reparticipation request.

The certificate authority that receives the notification tries to update the session certificate of the participation requesting device. Because the probability that the device is online at this time point is high, the possibility that the session certificate is successfully updated can be expected to be high. If the update is successful, the device is permitted to participate in the network. Namely, in a case where the session certificate after the update is presented to the neighboring device, the neighboring device determines that the presented session certificate is negative.

Here, the false-positive certificate list can also be formed using the Bloom filter. The false-positive certificate list formed using the Bloom filter is referred to as Bloom-filter false-positive certificate list. Not the false-positive certificate list but the Bloom-filter false-positive certificate list is distributed to each device in the network.

The device that receives the participation request tests a session certificate that becomes positive with reference to the Bloom-filter certificate revocation list, on the basis of the Bloom-filter false-positive certificate list. In a case where the test result is positive, the device that receives the participation request notifies the certificate authority to that effect. The certificate authority that receives the notification determines whether the session certificate of the device is actually positive, on the basis of the (non-Bloom-filter) false-positive certificate list. In a case where the session certificate is actually positive (is included in the (non-Bloom-filter) false-positive certificate list), the certificate authority tries to update the session certificate of the participation requesting device. In other case (in a case of false-positive), the certificate authority does not update the session certificate.

A set of targets of the Bloom-filter false-positive certificate list corresponds to all session certificates that can be positive with reference to the Bloom-filter certificate revocation list. This is significantly smaller than the number of all issued session certificates corresponding to a set of targets of the Bloom-filter certificate revocation list. Accordingly, the size of the Bloom-filter false-positive certificate list can be remarkably reduced compared with the size of the Bloom-filter certificate revocation list.

Figure 6:
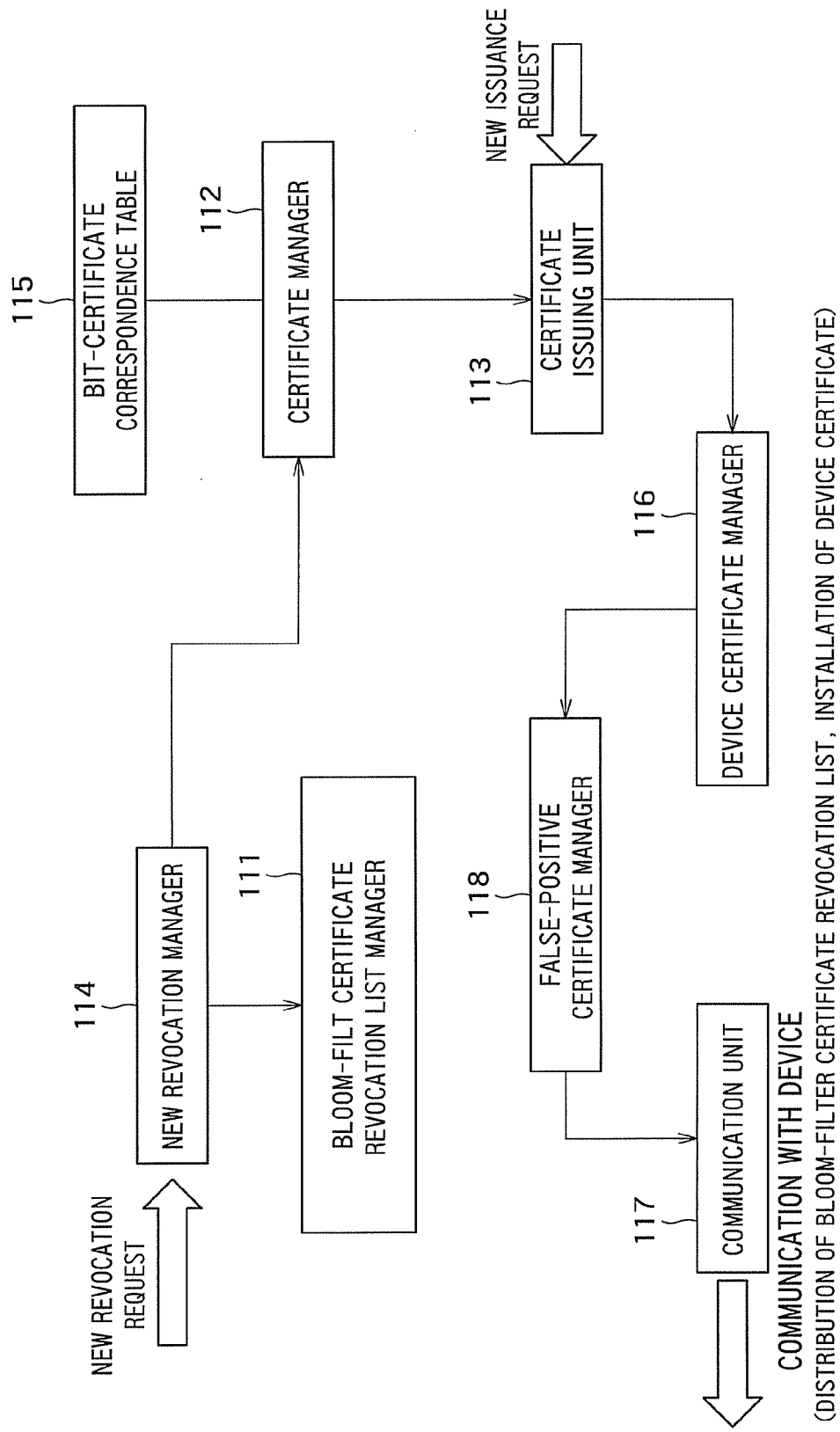
FIG. 6 is a block diagram of a server apparatus according to a third embodiment.

FIG. 6 is a block diagram of a server apparatus according to the present embodiment. A false-positive certificate manager 118 is newly added. In a case where installation of a session certificate that is newly issued due to false-positive is failed, the false-positive certificate manager 118 adds the session certificate before the update to the false-positive certificate list (or updates the Bloom-filter false-positive certificate list). The false-positive certificate manager 118 distributes the false-positive certificate list (or the Bloom-filter false-positive certificate list) after the update to each device via the communication unit 117.

In a case of receiving a notification that a device included in the false-positive certificate list makes a participation request, if a session certificate of the device is included in the false-positive certificate list, the device certificate manager 116 reinstalls a valid session certificate. If the valid session certificate is successfully installed, the false-positive certificate manager 118 deletes the corresponding session certificate (the session certificate determined as false-positive) from the false-positive certificate list (or updates the Bloom-filter false-positive certificate list).

Note that a session certificate issued at the last installation trial may be used for the session certificate installation (update). Alternatively, the session certificate issued at the last installation trial may be discarded upon a failure of its installation, and a session certificate may be issued again when reinstallation is tried this time.

Figure 7:
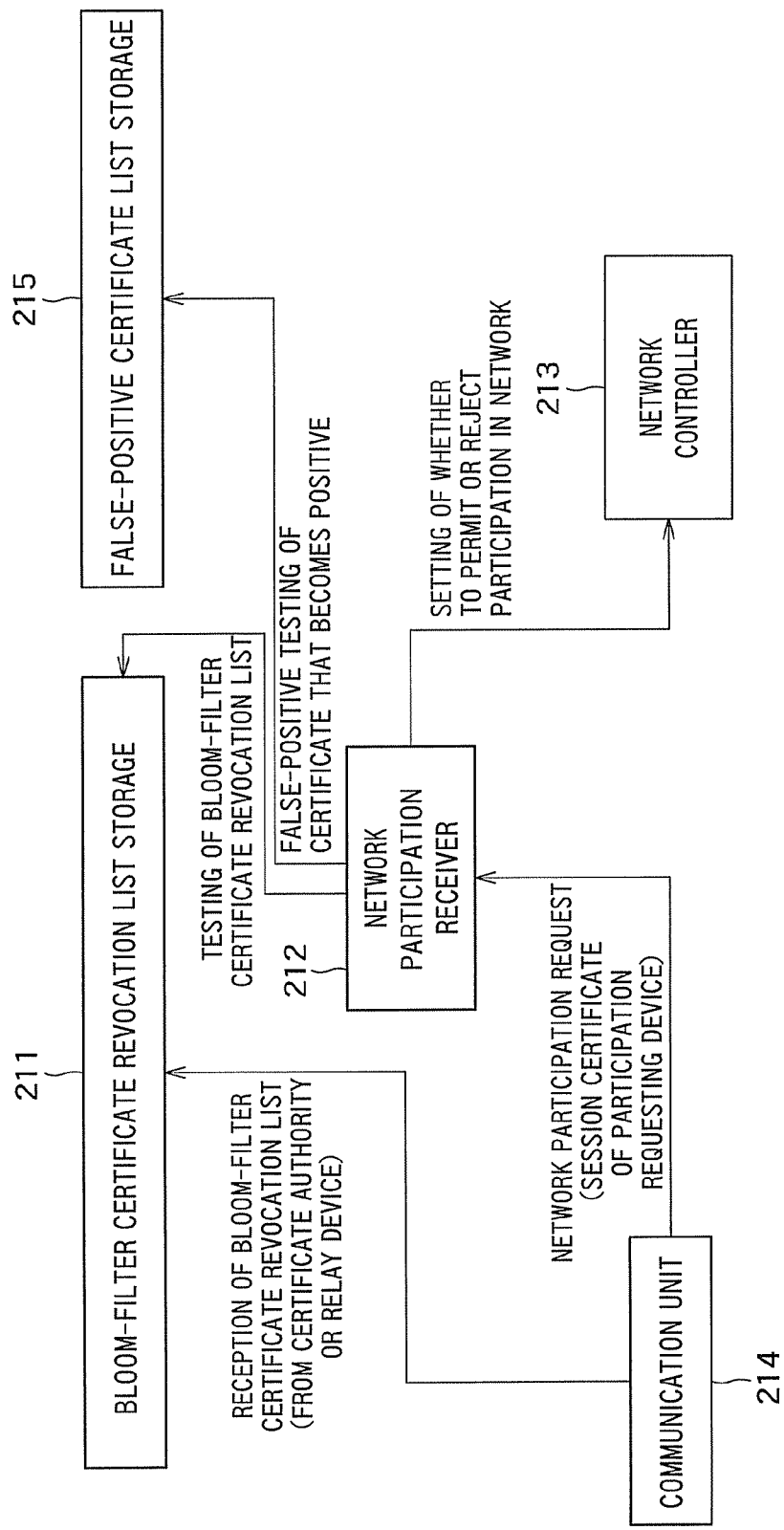
FIG. 7 is a block diagram of a device according to the third embodiment.

FIG. 7 is a block diagram of a device according to the present embodiment. A false-positive certificate list storage 215 is newly added. The false-positive certificate list storage 215 acquires the false-positive certificate list (or the Bloom-filter false-positive certificate list) distributed by the server apparatus (certificate authority) via the communication unit 214, and stores the list therein.

In a case where a session certificate presented by a device that makes a participation request is determined as positive with reference to the Bloom-filter certificate revocation list, the network participation receiver 212 tests whether the presented session certificate is included in the false-positive certificate list (is determined as positive with reference to the Bloom-filter false-positive certificate list). If the presented session certificate is included therein (or is determined as positive), the network participation receiver 212 notifies the certificate authority to that effect. If the presented session certificate is not included therein (or is determined as not positive), the network participation receiver 212 rejects connection of the device that makes the participation request. Note that, in a case where the presented session certificate is included therein (or is determined as positive), the network participation receiver 212 may once reject the connection to the network, of the device that makes the participation request, and may permit the participation thereof when a request with the session certificate after the update is received thereafter. Alternatively, the network participation receiver 212 may stand by until a new session certificate is installed by the certificate authority and a participation request with the session certificate after the update is received again.

In the first to third embodiments, a case where the server apparatus is a certificate authority and where the treated data is a session certificate is described as an example, but the present invention is not limited thereto. The present invention can be applied to any system configured as described below. That is, in the system, the server apparatus is configured to: issue data to each communication apparatus; distribute the data to each communication apparatus; manage the issued data set; invalidate data that satisfies a predetermined condition; generate a Bloom filter from a set of the invalidated data; and distribute the Bloom filter to each communication apparatus, and each communication apparatus tests validity of data presented by another communication apparatus with the use of the Bloom filter.

The server apparatus (Certificate Authority) and communication apparatus (device) as described above may also be realized using a general-purpose computer device as basic hardware. That is, processing of each block in the server apparatus and the communication apparatus can be realized by causing a processor mounted in the above general-purpose computer device to execute a program. In this case, the server apparatus and the communication apparatus may be realized by installing the above described program in the computer device beforehand or may be realized by storing the program in a storage medium such as a CD-ROM or distributing the above described program over a network and installing this program in the computer device as appropriate. Furthermore, the storage in the server apparatus and the communication apparatus may also be realized using a memory device or hard disk incorporated in or externally added to the above described computer device or a storage medium such as CD-R, CD-RW, DVD-RAM, DVD-R as appropriate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A server apparatus comprising:
processing circuitry configured to
communicate with a plurality of devices in a wireless network;
issue data to the devices, respectively; and
transmit the issued data to the devices, respectively; and
hardware storage configured to store a data set including the data issued to the devices, a filter having a predetermined bit length, and a revoked data set comprising a set of pieces of invalidated data, wherein
the processing circuitry is further configured to:
detect whether data satisfying a certain condition exists in the data set according to a revocation request, invalidate the data satisfying the certain condition, and add the invalidated data into the revoked data set in the hardware storage;
update the filter in the hardware storage each time invalidated data is added to the revoked data set, by setting first values to bits onto which the revoked data set including the invalidated data is projected in the filter according to a definitive projection relation and setting second values to bits different from the projected bits in the filter, and transmit the updated filter to the devices via the wireless network;

identify, from the data set in the hardware storage, reissuance target data other than the invalidated data, the reissuance target data having projection onto at least one of bits whose bit value has changed from the second value to the first value between before and after the update of the filter, and having the first values for all of bits onto which the reissuance target data is projected in the updated filter; and reissue, for the device having the reissuance target data, data having the second value for at least one of bits onto which the reissued data is projected in the updated filter, and transmit reissued data to the device via the wireless network, wherein the processing circuitry is configured to discard, in a case in which a number of pieces of data having projection onto a bit onto which the issued data is projected in the filter reaches an upper limit in the data set, the issued data, and repetitively issue data until data having projection onto a bit for which the upper limit is not reached is issued.

2. The apparatus according to claim 1, wherein the processing circuitry is further configured to compare the filters before and after the update, to thereby identify a bit whose value has changed from the second value to the first value between before and after the update of the filter, identify, from the data set, data having projection onto the identified bit, and when values of all of bits onto which the identified data is projected in the updated filter are the first values, identify the identified data as the reissuance target data.

3. The apparatus according to claim 1, wherein the processing circuitry is further configured to identify a bit in the filter in which a value of the bit among bits onto which the invalidated data is projected in the filter before the update is the second value, identify data having projection onto the identified bit, other than the invalidated data, from the data set, and specify the identified data as the reissuance target data in a case that values of all of bits onto which the identified data is projected in the updated filter are the first values.

4. The apparatus according to claim 1, wherein the processing circuitry is further configured to manage the data set using a bit-data correspondence table, which associates each bit in the filter with data having projection onto the bit.

5. The apparatus according to claim 1, wherein the hardware storage is configured to store a list, and for the devices for which transmission of the reissued data is failed, the processing circuitry is configured to add the reissuance target data of the devices to the list in the hardware storage, and transmit the list to the devices via the wireless network.

6. The apparatus according to claim 5, wherein the hardware storage is configured to store a first filter having the predetermined bit length, and the processing circuitry is configured to: update the first filter by setting the first values to bits on which a set of pieces of reissuance target data included in the list is projected in the first filter according to the definitive projection relation and setting second values to bits different from the projected bits in the first filter; and transmit the updated first filter instead of the list.

7. The apparatus according to claim 1, wherein the filter is a Bloom filter, and the definitive projection relation represents one or more hash functions whose output values each indicate an index of a bit in the filter.

8. The apparatus according to claim 1, wherein the processing circuitry is configured to generate a random number, and issue the data on a basis of the random number.

9. The apparatus according to claim 1, wherein the data is certificate data for permitting participation in the network.

10. The apparatus according to claim 1, wherein the first value is 1, and the second value is 0.

11. The apparatus according to claim 1, wherein the filter is a Bloom filter having a filter length m and phase k corresponding to a number of independent hash functions.

12. A data verification system comprising:

a plurality of devices connected in a wireless network; and a server apparatus, wherein the server apparatus comprises:

processing circuitry configured to issue data to the devices in the wireless network, respectively; and transmit the issued data to the devices, respectively;

hardware storage configured to store a data set including the data issued to the devices, a filter having a predetermined bit length, and a revoked data set comprising a set of pieces of invalidated data;

the processing circuitry being configured to detect whether data satisfying a certain condition exist in the data set according to a revocation request and invalidate the data satisfying the certain condition;

update the filter in the hardware storage each time the invalidated data is added to the revoked data set, by setting first values to bits onto which the revoked data set after adding is projected in the filter according to a definitive projection relation and setting second values to bits different from the projected bits in the filter;

and transmit an updated filter to the devices in the network;

identify, in the data set in the hardware storage, reissuance target data other than the invalidated data, the reissuance target data having projection onto at least one of bits whose bit value has changed from the second value to the first value between before and after the update of the filter, and having the first values for all of bits onto which the reissuance target data is projected in the updated filter; and reissue, for the device having the reissuance target data, data having the second value for at least one of bits onto which the reissued data is projected in the updated filter, and transmit reissued data to the device, and the devices each comprises processing circuitry configured to: test data received from one device of the plurality of devices on a basis of the filter received from the server apparatus; and determine that the data received from the one device is invalid when all values of bits onto which the data is projected in the filter are the first values, wherein the processing circuitry of the server apparatus is configured to discard, in a case in which a number of pieces of data having projection onto a bit onto which the issued data is projected in the filter reaches an upper limit in the data set, the issued data, and repetitively issue data until data having projection onto a bit for which the upper limit is not reached is issued.

13. The system according to claim 12, wherein
the hardware storage is configured to store a list, and
for the devices for which transmission of the reissued data is failed, the processing circuitry of the server apparatus is configured to add the reissuance target data of the devices to the list in the hardware storage, and transmit the list to the devices via the wireless network,
the processing circuitry of the device being configured to, in a case in which the data received from the one device is included in the list, notify information indicating that the data is included in the list to the server apparatus, and
the processing circuitry of the server apparatus being configured to, in a case in which the information is received from the device, retry transmitting the reissued data.

14. The system according to claim 13, wherein
the processing circuitry of the server apparatus is configured to: update the filter by setting the first values to bits onto which a set of pieces of reissuance target data included in the list is projected in the filter according to the definitive projection relation and setting second values to bits different from the projected bits in the filter; and transmit the updated filter instead of the list, and
the processing circuitry of the device is configured to, when all values of bits onto which the data received from the one device is projected in the filter are the first values, notify information that all values of bits are the first values to the server apparatus.

15. The system according to claim 12, wherein
the processing circuitry of the device is configured to, in a case in which a request to participate in the wireless network is received from the one device and in which the data received from the one device is determined as invalid, reject the participation of the one device in the wireless network.

16. The apparatus according to claim 12, wherein
the filter is a Bloom filter, and
the definitive projection relation represents one or more hash functions whose output values each indicate an index of a bit in the filter.

17. The apparatus according to claim 12, wherein
the data is certificate data for permitting participation in the network.

18. A data issuing method comprising:
issuing data to devices in a wireless network, respectively;
transmitting the issued data to the devices, respectively;
storing a data set including the issued data in a hardware storage;
detecting whether data satisfying a certain condition exists in the data set according to a revocation request and invalidating the data satisfying the certain condition and adding the invalidated data into a revoked data set in the hardware storage wherein the revoked data set comprises a set of pieces of data which have been invalidated;
updating a filter having a predetermined bit length in the hardware storage each time the invalidated data is added to the revoked data set, by setting first values to bits onto which the revoked data set after adding is projected in the filter according to a definitive projection relation and setting second values to bits different from the projected bits in the filter;
transmitting the updated filter to the devices via the wireless network;
identifying, in the data set in the hardware storage, reissuance target data other than the invalidated data, the reissuance target data having projection onto at least one of bits whose bit value has changed from the second value to the first value between before and after the update of the filter, and having the first value for all of bits onto which the reissuance target data is projected in the updated filter;
reissuing, for the device having the reissuance target data, data having the second value for at least one of bits onto which the reissued data is projected in the updated filter and transmitting reissued data to the device via the wireless network; and
discarding, in a case in which a number of pieces of data having projection onto a bit onto which the issued data is projected in the filter reaches an upper limit in the data set, the issued data, and repetitively issuing data until data having projection onto a bit for which the upper limit is not reached is issued.

* * * * *